United States Patent [19]

Moore

[11] 4,139,145
[45] Feb. 13, 1979

[54] BAND WELDING FIXTURE

[75] Inventor: Donn F. Moore, Utica, Mich.

[73] Assignee: Computer Peripherals, Inc., Rochester, Mich.

[21] Appl. No.: 835,112

[22] Filed: Sep. 21, 1977

[51] Int. Cl.² .................................................. B23K 37/04
[52] U.S. Cl. ........................................ 228/212; 228/5.7
[58] Field of Search ..................................... 228/5.7, 212

[56] References Cited

U.S. PATENT DOCUMENTS

| 3,190,525 | 6/1965 | Foley et al. | 228/5.7 |
| 3,458,103 | 7/1969 | Davis | 228/5.7 |

Primary Examiner—Nicholas P. Godici
Assistant Examiner—K. J. Ramsey
Attorney, Agent, or Firm—G. J. Muckenthaler; W. Hawk, Jr.; J. T. Cavender

[57] ABSTRACT

A welding fixture includes members supporting the ends of a print band and spaced to permit welding of the ends of the band with a laser beam. The edges of the band on either side of the weld joint are held parallel by means of at least two alignment pins on either side of the weld with the pins forming one terminal of a plurality of switches in circuitry to indicate proper alignment of the band prior to welding. One support member of the fixture is pivotable or tiltable to enable the ends of the band to be made square prior to welding.

2 Claims, 6 Drawing Figures

BAND WELDING FIXTURE

BACKGROUND OF THE INVENTION

In the field of use of a print or type band for printing machines, such type band is normally installed in an endless loop on the printing machine. When the print band has been etched or formed with type characters, the ends of the band must be welded together to provide a continuous band for use on the printer. It is necessary of course that the ends of the band be perfectly aligned with each other to insure that the portions of the band on either side of the weld joint are parallel and that the ends of the band are square during welding to assure that the continuous band forms a true geometric cylinder like loop. Additionally, when the band is received for welding, the band generally has been formed in a preset condition and assumes a permanent set condition which is a curvature retained from the carrying of the print band on a spool during delivery thereof after the characters have been etched onto the band. It is therefore important that the welding fixture be of a nature to hold the ends of the print band in precise position and to maintain the alignment of the band during welding.

Representative prior art in welding apparatus includes U.S. Pat. No. 1,931,255, issued to A. J. Frantz on Oct. 17, 1933, which shows welding machine control of butt welding machines to provide control mechanism arranged to enable proper actuation and control of the welding machine from a single station. Use is made of compressed air, of electricity and of oil for control and clamping of the members to be welded.

U.S. Pat. No. 2,293,481, issued to L. A. Wilkie on Aug. 18, 1942, shows a welding device for welding band saws in the form of an endless band and includes means for automatically opening the welding circuit when the welding operation is completed.

U.S. Pat. No. 3,487,188, issued to W. J. Draving on Dec. 30, 1969, shows a method for butt welding the ends of a length of wire formed in a loop. The loop is positioned intermediate the wire holders for electrically shunting the discharge of a capacitive discharge type welding apparatus.

U.S. Pat. No. 3,768,148 issued to G. Pagnotta et al., on Oct. 30, 1973, discloses a method of joining print character bars to high speed printer fingers which includes forming spacer projections in the bar or finger blank prior to welding the parts together in order to provide a fixed gap between the finger and the bar for a uniform layer of weld material with a resulting uniform joint between the parts.

SUMMARY OF THE INVENTION

The present invention relates to welding the ends of a printing band or like member and more particularly to a print band welding fixture so as to provide means for holding and locating the two ends of a metal print band in proper position relative to each other for joining the ends of the band and to provide a continuous loop or endless band for use on a band printer.

It is necessary that the edges of the band on either side of the weld joint be parallel to each other during welding so as to assure that the welded band is formed to be a true geometric cylinder or ring. There are a plurality of band alignment pins on the welding fixture which serve as locating means or stops wherein the band is aligned with the pins to indicate a straight condition of the band prior to welding. Each of the alignment pins comprises a portion of a permissive circuit wherein the welding operation cannot take place unless the print band is in contact with all of the alignment pins.

It is also necessary that the print band be securely clamped during the welding operation to maintain the flatness and proper alignment thereof. This is accomplished by means of differential air pressure acting downward on the top surface of the band wherein such pressure is achieved by evacuating a chamber formed by a cavity in the band support plate. This pressure forms an airtight seal on the band which is utilized for restraint when the print band is first applied to the supporting surfaces and then clamping members are used to maintain the band in position during the welding operation.

Since the print band has a set curvature therein, the ends of the band are positioned in and bridge a slot on the welding fixture to provide space for the laser beam to weld the two ends together. Since the band has such set curvature, this condition shows up at the band ends in the form of a distortion of the band and hence requires correcting prior to welding the ends together. This distortion is eliminated by providing a tilting support plate on one side of the welding fixture slot so that the ends of the band can be aligned and squared to compensate for the set curvature prior to welding — permitting the weld to be made with the band clamped or retained in a straight and aligned position.

In view of the above discussion, the principal object of the present invention is to provide a welding fixture for connecting the ends of a print band.

Another object of the present invention is to provide a support member which can be tilted to compensate for the curvature in the print band.

A further object of the present invention is to provide means for holding the print band in a flat plane or condition during the welding operation.

An additional object of the present invention is to provide alignment pins which form a part of a permissive circuit to insure parallel alignment of the band during the welding operation.

Additional advantages and features of the present invention will become apparent and fully understood from a reading of the following description taken together with the annexed drawing.

DESCRIPTION OF THE PREFERRED EMBODIMENT

Figure 1:
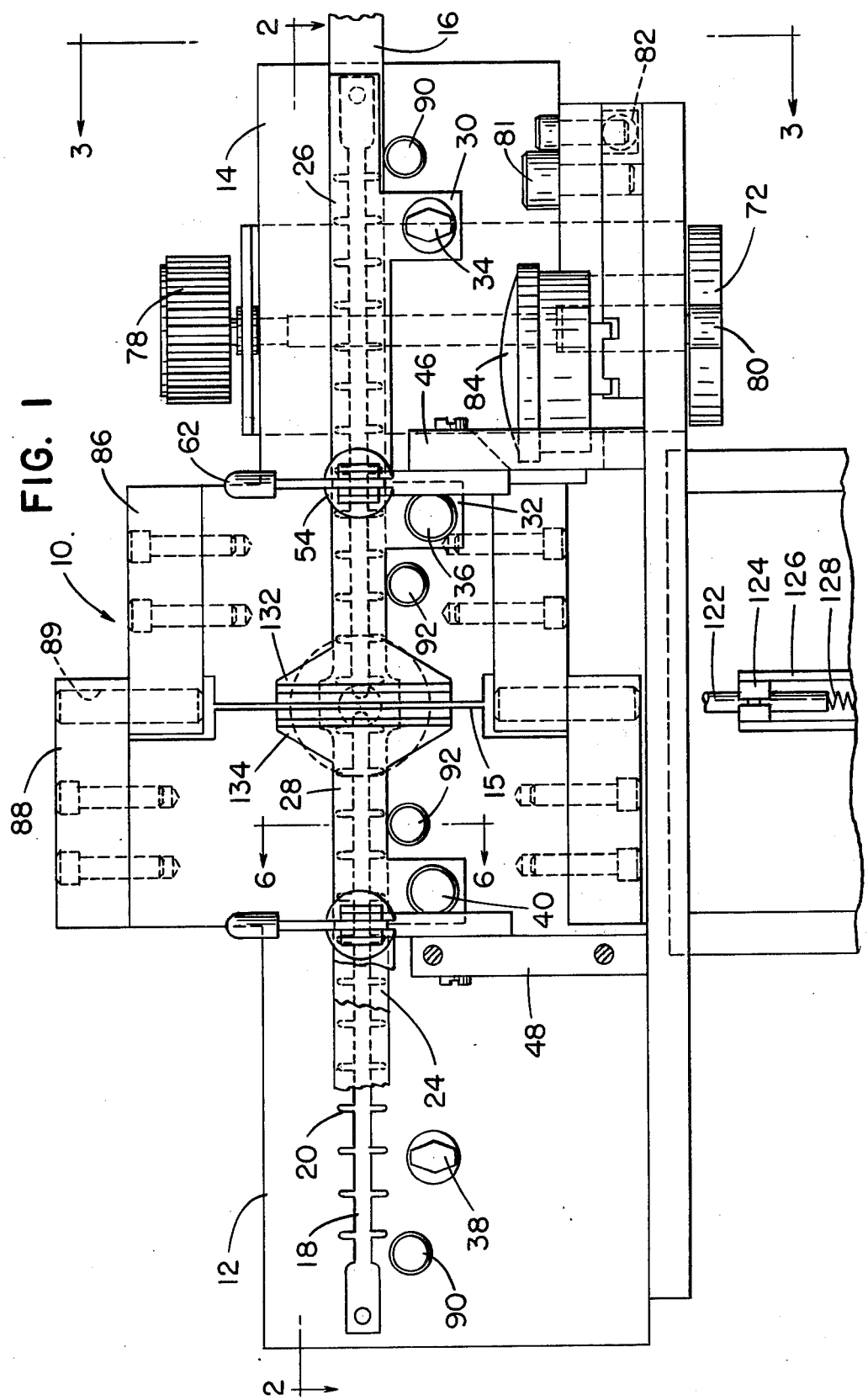
FIG. 1 is a side elevational view of a portion of the welding fixture and showing the print band in position.

Referring now to the drawing, in FIG. 1 there is shown a side elevational view, or which may be termed a front view, of a welding fixture 10 which includes a pair of support members 12 and 14 (which members are metal plates) disposed vertically in an end-to-end relationship and providing a clearance or slot 15 therebetween. At the outset, it is necessary to say that the left hand support member 12 is fixed in position whereas the right hand support member 14 is adapted to be tilted or slanted away from a planar position with respect to the member 12, the purpose of which will be later described. The two support members are generally rectangular in shape and of a metallic material and of a thickness as better seen in FIG. 2 wherein the adjacent edges of the two members are made to form a V, also for a purpose to be later described. As illustrated, the support members 12 and 14 provide a table for supporting one side surface of a print band 16 which has been formed in a narrow metallic strip and on which have been etched a plurality of type characters, the band to be used in a printer in a continuous loop fashion wherein the band is caused to be driven past a printing station.

When the band 16 is ready to be welded, the end portions of the band are placed against the support members 12 and 14 with the ends of the band adjacent one another at the junction of the two support members and positioned for welding the band ends so as to perform a continuous loop print band. Each of the support members 12 and 14 includes an elongated slot 18 therein for the purpose of drawing a vacuum therethrough when the print band 16 is placed on the two members. Each of the elongated slots 18 includes a plurality of cross-slots 20 which are utilized to increase the vacuum effect over a greater portion of the print band 16 so as to hold the band against the support members 12 and 14 prior to the welding operation, and as an aid in positioning the end portions during the time of clamping such portions to the welding fixture. It is of course realized that a vacuum pump, not shown, would be effective to draw a vacuum in the elongated slot 18 to maintain the print band against the surfaces of the support members 12 and 14.

Figure 2:
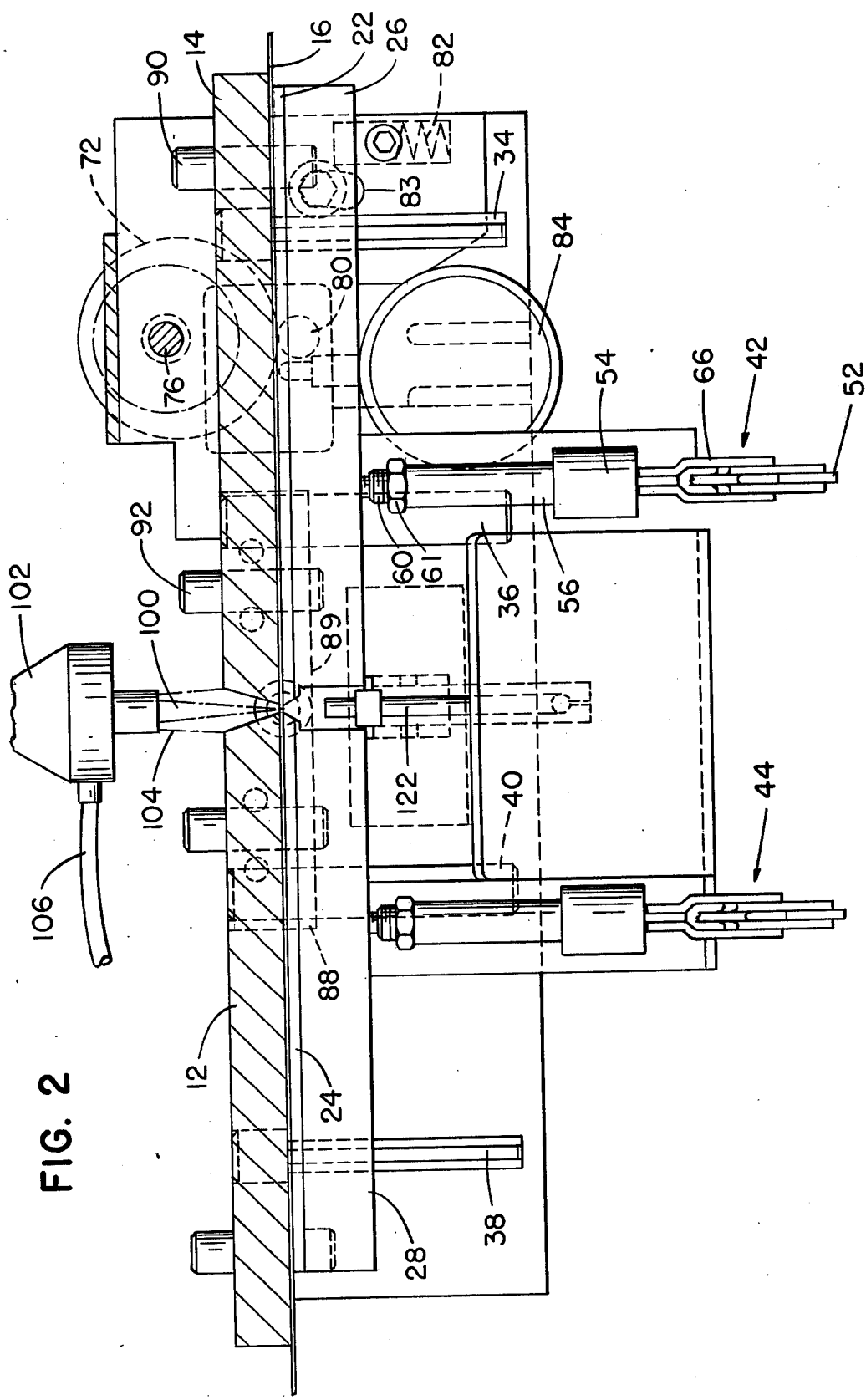
FIG. 2 is a top or plane view taken along the plane 2—2 of FIG. 1.
Figure 3:
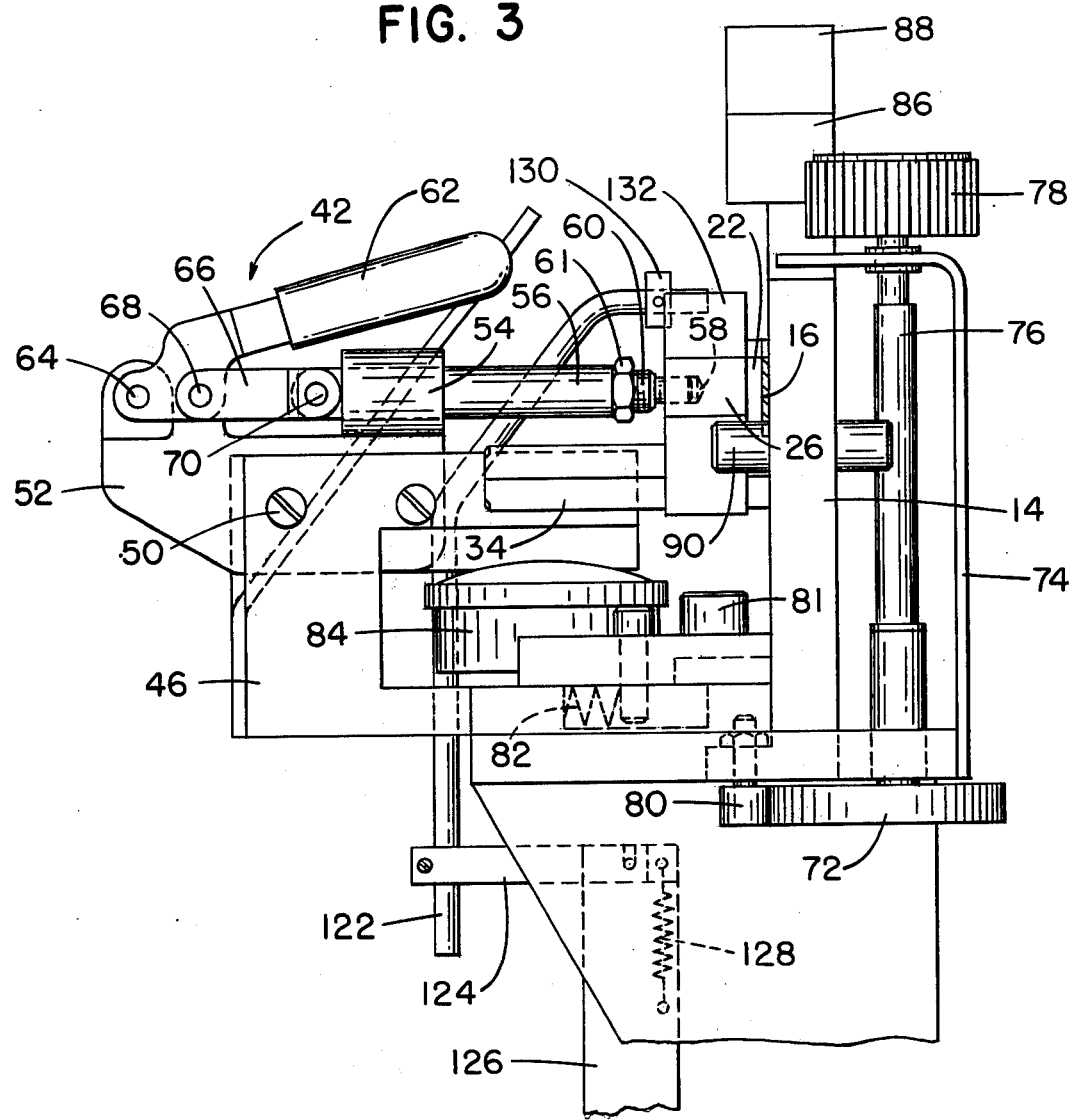
FIG. 3 is an end view taken along the plane 3—3 of FIG. 1.

Additionally, clamping members to maintain the print band against the support members include the use of a pair of brass sole plates or strips 22 and 24, which strips are substantially the same width as the print band 16 and which strips extend from nearly the right end of the support member 14 to the left end of support member 12 with a gap therebetween, as shown in FIG. 2. The clamp sole plates or strips 22 and 24 are used in conjunction with a pair of clamp shoe members 26 and 28 which may be made of steel and which generally are of the width of the print band 16 and also extend nearly from the right edge of the support member 14 to the left edge of the support member 12 with a gap or space therebetween at the center of the supporting table. Each of the clamp shoe members 26 and 28 includes portions 30 and 32 projecting downwardly with such portions 30 and 32 of member 26 surrounding and carried on supporting pins 34 and 36, and with portions 30 and 32 of clamp member 28 carried on supporting pins 38 and 40. As seen in FIGS. 2 and 3, supporting pins 34, 36, 38 and 40 are secured to the respective support plates 12 and 14 and extend outwardly therefrom for the purpose of providing a sliding support for the clamp shoe members 26 and 28 to enable such members to be moved toward and away from the print band supporting surfaces of members 12 and 14.

A pair of toggle levers or clamps 42 and 44 are supported from frame members 46 and 48 of the fixture by suitable screws 50 (FIG. 3). Since the toggle clamps 42 and 44 are substantially identically constructed, only the details of the toggle clamp 42 will be described. The clamp 42 includes a supporting plate member 52 which is secured to the frame member 46 and the clamp includes a cylinder 54 for slidably journaling a cylindrical member 56 therethrough upon actuating or operating the toggle clamp. The cylindrical member 56 includes a threaded portion 58 at the end thereof, as seen in FIG. 3, which threaded portion is inserted into the clamp shoe member 26 so as to be secured thereto and to move the clamp shoe member toward and away from the support plate 14 upon operation of the toggle clamp. The end of the cylinder 56 may also include a portion 60 thereon so as to provide adjustability in relation to the clamp shoe member 26 with a jamb nut 61 being provided on the portion 60 of the member 56. The toggle clamp 42 includes a handle 62 which is pivoted at 64 to the supporting plate member 52 and is also connected with a link 66 which is pivoted at 68 and at 70, the pivot 68 being connected with the handle portion 62 and the pivot 70 being connected with the member 56. Since the toggle clamp is a commercially-available item, it is only necessary to say that when the handle 62 is swung in a counter-clockwise direction, as seen in FIG. 3, the pivot 68 will move upwardly and to the left so as to move the link 66 in an inclined directon with the link being pivoted at 70 and drawing the member 56 through the cylinder 54 so as to move the clamp shoe 26 away from the support member 14.

As mentioned above, the right hand support plate member 14 may be tilted or swung in a direction away from its straight position, this being done by means of a cam member 72 which is supported from a frame member 74 and connected with a shaft 76, the shaft and cam member being operated by a knob 78 (FIGS. 1 and 3). The cam 72 operates with a cam follower 80 whereupon rotation of the knob 78 will cause the right hand support member 14 to be moved in a counter-clockwise direction as seen in FIG. 2 around the midpoint of the fixture to enable such member 14 to be moved in the range of two to four degrees from the straight position, the member 14 being normally urged or biased by a spring 82 to a tilted or slanted position with respect to member 12 so as to enable the ends of the band to be straight and square when welding the band ends together (see FIG. 5). A stud 81 and a curved slot 83 (FIG. 2) are provided adjacent the spring 82 for enabling the two to four degree movement of the member 14. A dial indicator 84 may be used and observed to indicate the degree of tilt or movement of the right hand support member of the fixture. Pivot blocks 86 and 88 (FIGS. 1 and 3) are secured by suitable screws to the support members 14 and 12, respectively, the member 14 being pivotable on a pin 89 as the member is caused to be swung from the position aligned with member 12. Similar blocks are provided at the lower end of the fixture, i.e., below the print band, in association with a second pivot pin, as shown in FIG. 1.

Each of the support members 12 and 14 has secured therein a pair of alignment pins 90 and 92 upon which the lower edge of the print band 16 is supported. When properly placed in the fixture and clamped by the members 26 and 28, welding of the print band 16 is performed by a laser beam 100 which is emitted from a lens assembly 102, the laser beam 100 being surrounded and protected by an envelope or cover of inert gas 104 which may be argon gas or the like. The argon gas may be introduced through a tube 106 into the lens assembly 102 to be used as the protective cover over the laser beam 100, that is, the gas serves to prevent oxidation of the print band end portions in the area of the weld.

Figure 4:
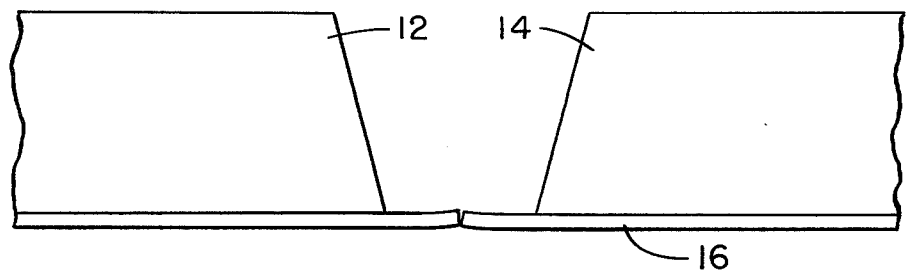
FIG. 4 is an enlarged view of the band with the band supporting members in a substantially straight position.
Figure 5:
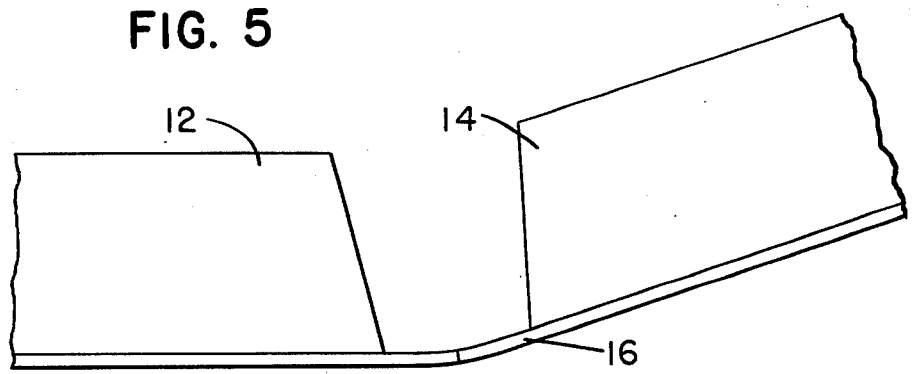
FIG. 5 is a view of the band with one supporting member swung at an angle from that shown in FIG. 4.

Referring now to FIGS. 4 and 5, which are enlarged views of the ends of the support members 12 and 14 and of the ends of the print band 16, in FIG. 4 is shown the position of the print band in relation to the support members 12 and 14 when such members are in a straight condition and wherein it can be seen that the ends of the print band have a predetermined set or "gull-wing" effect by reason of the forming of the print band from a roll of stock which had been formed in a circular manner. FIG. 5 shows the support member 14 being tilted or slanted from the support member 12 sufficiently to position the ends of the print band 16 square and straight prior to and during the welding operation. While the amount of angular tilting required is generally from two to four degrees, the range may be increased from one to five degrees or more if the preset curvature of the print band is greater.

Figure 6:
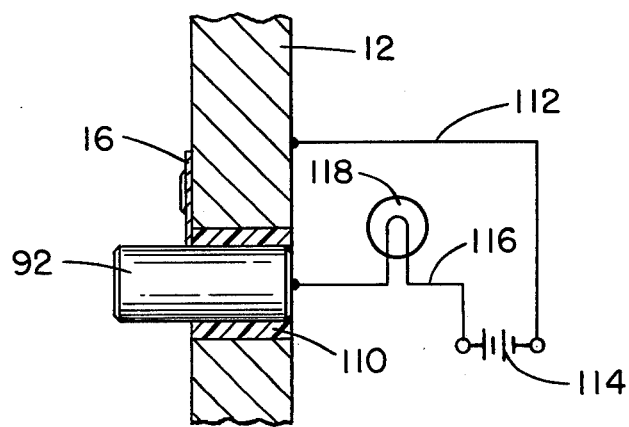
FIG. 6 shows a permissive circuit for a band alignment pin.

In FIG. 6 is shown a representative permissive circuit wherein the support member 12 includes an insulating bushing 110 which supports one of the alignment pins 92 upon which the print band 16 rests along with the alignment pins 90 for supporting the print band when welding same. A lead 112 is connected to a voltage source 114 and to the support member 12. A second lead 116 is connected to the voltage source 114 and runs to a lamp 118 and then to the alignment pin 92. A low voltage source is used to minimize arcing at the contact points between the band 16 and the alignment pins 90 or 92. It is seen that the circuit is completed through the print band 16 when in contact with the alignment pin 92 and at such time the lamp 118 is lighted to indicate that the print band 16 is aligned for the welding operation. In the preferred embodiment, all of the alignment pins 90 and 92 must be contacted by the print band 16 for lighting four of such lamps 118 at the time of the welding operation to indicate that the band is precisely in a straight position.

A tubular member 122 supplies an inert cover gas to protect the front side of the print band and is connected to a link member 124 which is pivoted to a frame member 126 and biased by a spring 128, the tubular member 122 extending upwardly and toward the clamp shoes 26 and 28 (FIG. 3). A clamp 130 is secured to the upper end portion of the member 122 and is in contact with enlarged inner end portions 132 and 134 of the clamp shoes 26 and 28. The portions 132 and 134 are provided to accommodate extra width zones at the ends of the print band, as seen in FIG. 1, which zones after the welding operation are in suitable manner removed so as to present a straight line on each edge of the print band.

In the operation of the welding apparatus, the toggle clamps 42 and 44 are operated to move the clamp shoe members 26 and 28 away from the print band support plates 12 and 14 to enable insertion of the print band 16 along such support plates and over the elongated slot 18 with the ends of the print band joined together as seen in FIG. 4. When the print band is so placed in position on the alignment pins 90 and 92, a vacuum pump, not shown, draws a vacuum through the elongated slots 18 to hold such band in position while the toggle clamps 42 and 44 are operated to move the clamp shoe members 26 and 28 against the print band to hold same in precise position during the welding operation. The knob 78 is then rotated to the proper position so as to tilt the right hand support member 14 from the straight position and thus carry the one end of the print band 16 in a counter-clockwise direction, as seen in FIG. 5, to effect joining of the preset ends of the print band in a square condition for welding thereof. The pivot axis of support member 14 is located in the plane of the bottom surface of the band 16, as seen in FIG. 2, so that tilting or swinging of such support member to achieve the square condition described does not alter the degree of abutment of the band ends to be welded. Of course, when the welding operation is complete, the toggle clamps 42 and 44 are operated to move the clamp shoe members 26 and 28 from the clamped position and the print band 16 is removed from the welding fixture.

It is thus seen that herein shown and described is a fixture for welding a print band with a laser beam wherein the fixture includes clamping means which may be angled or tilted to compensate for preset curvature of the band, vacuum slots in the clamping means for holding the plane of the print band in a flat condition, and band alignment pins with indication of parallel alignment of the band edges during the welding operation. The apparatus enables the accomplishment of the objects and advantages mentioned above, and while one embodiment of the invention has been disclosed herein, variations thereof beyond those herein mentioned may occur to those skilled in the art. It is contemplated that all such variations not departing from the spirit and scope of the invention hereof are to be construed in accordance with the following claims.

What is claimed is:

1. A method of butt welding the ends of a print band in welding apparatus having a pair of support members for said print band with a space between opposing edges thereof, comprising the steps of:
    positioning the ends of the print band in juxtaposed relationship at the space between said opposing edges of the support members,
    positioning the edge of the print band along a path to provide lengthwise alignment of the print band,
    clamping the print band to said support members in a manner to maintain the ends and the edge of the print band as so positioned, and
    tilting one of said support members in relation to the other for squaring the ends of said print band prior to welding thereof.

2. The method of claim 1 including the additional step of indicating alignment of the edge of said print band.

* * * * *